United States Patent [19]

Maehara et al.

[11] Patent Number: 4,640,391
[45] Date of Patent: Feb. 3, 1987

[54] AUTOMATIC STOP VALVE DEVICE FOR VEHICLE BRAKE SYSTEMS

[75] Inventors: Toshifumi Maehara, Hanazono; Masayuki Kurata, Kazo, both of Japan

[73] Assignee: Akebono Brake Industry Company, Ltd., Japan

[21] Appl. No.: 508,506

[22] Filed: Jun. 28, 1983

[30] Foreign Application Priority Data

Jul. 12, 1982 [JP] Japan ................ 57-120769

[51] Int. Cl.⁴ ............................ B60T 11/28
[52] U.S. Cl. ................ 188/353; 251/129.14; 251/129.18; 251/129.21
[58] Field of Search ........... 188/353, 265; 303/84 R, 303/89; 251/139, 180, 129.14, 129.18, 129.19, 129.21; 192/3 H, 13 A; 137/599

[56] References Cited

U.S. PATENT DOCUMENTS

| | | | |
|---|---|---|---|
| 1,822,668 | 9/1931 | Protzeller | 251/129.18 |
| 2,296,132 | 9/1942 | Wiseley | 188/353 |
| 2,301,037 | 11/1942 | Greene | 188/353 |
| 2,391,129 | 12/1945 | Chambers | 188/353 |
| 2,638,118 | 5/1953 | Chandler | 188/353 |
| 2,762,476 | 9/1957 | Gaylord et al. | 251/139 |
| 2,868,494 | 1/1959 | Kearns et al. | 251/129.14 |
| 3,719,401 | 3/1973 | Peruglia | 303/119 |
| 3,887,162 | 6/1975 | Antoni et al. | 251/129.14 |
| 4,152,030 | 3/1979 | Blomberg et al. | 303/119 |
| 4,239,154 | 12/1980 | Inada et al. | 137/599 |
| 4,437,488 | 3/1984 | Taggart et al. | 251/129.18 |

FOREIGN PATENT DOCUMENTS

1534065  3/1978  United Kingdom .

Primary Examiner—Duane A. Reger
Assistant Examiner—Alvin Oberley
Attorney, Agent, or Firm—Leydig, Voit & Mayer

[57] ABSTRACT

An automatic stop valve device adapted to be mounted in the fluid pressure brake system of a vehicle and having a valve mechanism capable of being shifted between an open and a closed state and operative by closing to maintain fluid pressure in the system to hold the brakes in an applied condition. An electromagnetic mechanism having a coil and an armature actuated by the coil is capable of shifting the valve mechanism to its closed state. The electromagnetic mechanism is arranged to be energized to hold the brakes in the applied condition when a moving vehicle is brought to a stop, to maintain the valve mechanism closed while the vehicle remains stopped to hold the brakes in the applied condition and to open the valve mechanism when the operation of the vehicle resumes to release the brakes. Provision of a bypass around the valve mechanism permits the fluid pressure transmitted to hold the brakes to be increased even when the electromagnetic mechanism is energized to actuate the valve mechanism to its closed state.

11 Claims, 3 Drawing Figures

AUTOMATIC STOP VALVE DEVICE FOR VEHICLE BRAKE SYSTEMS

TECHNICAL FIELD:

This invention relates to an automatic stop valve device for maintaining brake valve fluid pressure in brake systems of wheeled vehicles.

BACKGROUND OF THE INVENTION

It is generally desired in the operation of vehicles to hold the vehicles from movement after the operator has applied the brakes and caused the vehicle to be brought to a stop, and before the operator has resumed operation of the vehicle. With most vehicles, however, after stopping the vehicle by applying the brakes using the brake pedal, the brakes are released when the pedal is released and it is necessary to use a parking brake if the vehicle is stopped on a sloping road or the like. However, the use of a parking brake is troublesome. Therefore, the parking brake is often not used except on a sloping road. Frequently, vehicles when stopped are thus left without the brakes being applied which involves the possibility of an unexpected movement of the vehicle from its stopped position. Furthermore, in the operation of a vehicle with manual transmission, for example, when a vehicle is stopped at a traffic light on an upwardly sloping road, it is difficult to hold the vehicle from moving backward when the light changes and the operator must remove the right foot from the brake pedal and press it on the accelerator, since the release of the brakes when the foot is removed from the brake pedal will allow the vehicle to roll backward unless the clutch is smoothly engaged to cause the vehicle to move forward under power.

DISCLOSURE OF INVENTION:

The principal object of the present invention is to provide an automatic stop valve device for maintaining the brake fluid pressure to the wheel cylinders applying the brakes of a vehicle brake system, after sufficient brake fluid pressure to apply the brakes has been produced and the vehicle has been brought to a stop by the operator.

A related object is to provide an automatic stop valve device having an electromagnetic mechanism which is energized after the vehicle has been brought to a stop to actuate a valve mechanism for maintaining the brake fluid pressure transmitted to apply the brakes, and which is deenergized when the operation of the vehicle resumes to permit its normal operation.

Another more specific object of the invention is to provide an automatic stop valve device requiring a minimal actuating force, making it feasible to provide the requisite actuating force by means of an electromagnetic mechanism having an extremely simplified structure.

Another important object of the invention is to provide an automatic stop valve device which, after being actuated to maintain brake fluid pressure in the lines to the brakes, permits the master cylinder of the brake system to be operated to increase the fluid pressure transmitted to the brakes in order to obtain a greater braking force.

These and further objects and advantages of the invention will become clear from the following detailed description of preferred embodiments of the invention taken in conjunction with the accompanying drawings.

Figure 1:
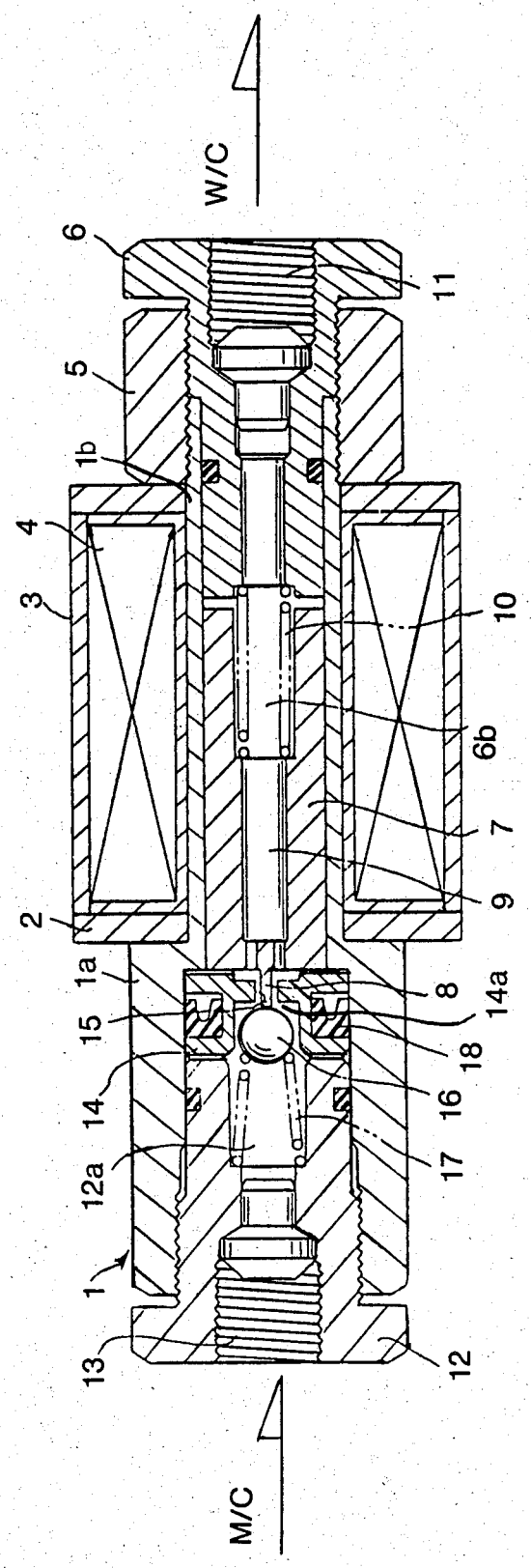
FIG. 1 is a longitudinal sectional view showing an automatic stop valve device embodying the present invention.

BEST MODES FOR CARRYING OUT THE INVENTION:

Referring to FIG. 1, an exemplary embodiment of an automatic stop valve device constructed according to the invention is adapted to be connected in a vehicle brake system by means of a fitting threaded into an inlet port 13 at the left end of the device which is adapted to be connected through a brake line to the master cylinder to receive brake fluid pressure, and by means of a fitting threaded into an outlet port 11 at the right end of the device which is adapted to be connected by a brake line to the wheel cylinders for transmitting brake fluid pressure for applying the brakes.

In carrying out the invention, the automatic stop valve device illustrated in FIG. 1 includes a normally open valve mechanism capable of being shifted between an open and a closed state, herein shown as a ball valve comprising a ball 16 cooperating with a valve seat 14a. The device further includes an electromagnetic mechanism including a coil 4 for actuating a movable armature 7 connected to shift the valve mechanism including the ball 16 to its closed state upon the coil being energized when the moving vehicle comes to a stop from fluid pressure applying the brakes, to maintain fluid pressure transmitted to the wheel cylinders and thereby hold the brakes in applied condition.

For this purpose, the device includes a tubular sleeve 1 which is made of non-magnetic material and has axially joined stepped, tubular sections 1a, 1b. The forward tubular smaller diameter section 1b of the sleeve has a coil housing 3 for the coil 4 and is secured thereto through a bracket 2. To the end of the forward, smaller diameter section 1b of the sleeve 1, are secured a nut 5 and metal plug 6 which also serves as an iron core.

The bracket 2, the housing 3, the nut 5 and the plug 6 are respectively made from magnetic materials. They constitute, in conjunction with the armature 7 which is disposed and movable axially within the smaller diameter forward section 1b of the sleeve 1 a magnetic circuit operated by the coil 4. A set spring 10 is arranged between the armature 7 and the plug 6 to resiliently urge the armature 7 toward the larger diameter rearward section 1a of the sleeve 1 and is thus positioned against a stop surface presented by a valve seat body 14 which is secured to the inside of the larger diameter rearward section 1a of the sleeve 1. When so positioned, a locking rod 8 extending from the rearward end of the armature 7 penetrates an axial fluid passage 15 through the valve seat body 14 and is arranged to engage and shift the ball 16 off the valve seat 14a which is provided by the valve body 14.

An axial fluid passage 9 extending through the armature 7 is adapted to communicate with the wheel cylinder of the brake device through the port 11 provided through the plug 6.

Another plug 12 is screwed and fixed in place in the end of the large diameter rearward section 1a of the sleeve 1. With the plug 12 thus fixed in place, the valve seat body 14 is also fixed in place. With this construction, according to the invention, an input chamber 12a is formed inside the end portion of the plug 12 which is adapted to communicate with a master cylinder through the inlet port 13.

The ball 16 of the valve mechanism is pushed toward the valve seat 14a of the valve seat body 14 by a holding spring 17 which exerts lesser spring force than the armature set spring 10. Thus, the ball 16 is normally separated from the valve seat 14a by the locking rod 8 of the armature 7 to allow fluid communication between the input chamber 12a and an output chamber 6b. The input and output fluid chambers 12a and 6b are thus provided on the opposite sides of the ball 16 within, respectively, the plugs 12 and 6 of the device. The input and output chambers are normally maintained in communication with, respectively, the master cylinders and the wheel cylinders to permit normal brake operation.

In accordance with the invention, the ball 16 and the valve seat 14a jointly form a valve mechanism operable upon energization of the coil 4 to cause the ball 16 to seat on the valve seat 14a and to block communication between the input and output chambers 12a, 6b, to maintain fluid pressure within the output chamber and the brake lines to the wheel cylinders and thereby maintain and hold the brakes in applied condition.

Further in carrying out the invention, means are provided for bypassing the valve mechanism between the input and output chambers 12a and 6b when the valve mechanism is in its closed state, to permit the operation of the brake pedal to increase the fluid pressure transmitted through the brake line to the wheel cylinders. For this purpose, a U-shaped cup seal 18 of a unidirectional characteristic is provided as a one-way fluid passing means around the periphery of the valve seat body 14. This unidirectional U-shaped cup seal 18 is attached to a peripheral groove in the valve seat body 14 and is resiliently in contact with the inner circumference of the sleeve 1 to tightly seal against leakage around the outside of the valve body 14 in the direction between the output chamber 6b and the input chamber 12a. The shape and mounting direction of the U-shaped seal 18 is such as to allow fluid to flow only from the input fluid chamber 12a to the output fluid chamber 6b around the periphery of the valve seat body 14 and to prevent flow in the reverse direction.

In this embodiment of the invention, the coil 4 is arranged to be energized by receiving a prescribed electrical signal immediately before the vehicle is brought to a stop, for example, by brake application or when the vehicle decelerates to a speed below a prescribed value. When energized, the coil force shifts the armature forward and the locking rod 8 is retracted through the valve body 14, allowing the ball 16 to seat on the valve seat 14a. The energization is controlled to continue until the vehicle is caused to move forward or backward after it has stopped or deceleration has discontinued, for example, by the operation of engaging a clutch of a vehicle having a manual transmission. In the case of a vehicle having an automatic transmission, however, an arrangement may be employed to discontinue the energization of the coil 4 in response to the operator stepping on the accelerator pedal of the vehicle. In all cases, the brake fluid pressure is controlled to be maintained before release of the manual brake operation and to cause no difficulty in starting movement of the vehicle after the vehicle has stopped. The coil energization is thus controlled in a manner that most suits the kind and nature of the vehicle.

It is a feature of the invention that in the initial stage of transfer of brake fluid pressure through the automatic stop valve device, which is in the state as shown in FIG. 1, an axial fluid pressure force acts on the armature 7 in a balanced manner. Since the spring force F1 of the set spring 10 is arranged to be larger than the spring force F2 of the holding spring 17 (F1>F2) the brake fluid pressure is transmitted from the master cylinder directly to the wheel cylinders.

When the speed of the vehicle drops and the coil 4 is energized before the vehicle comes to a stop under this condition, the armature 7 is pulled by attraction to the right as viewed in FIG. 1. Accordingly, the locking rod 8 is retracted toward the output fluid chamber 6b. This causes the ball 16 to come into contact with the valve seat 14a to cut off communication between the input and output fluid chambers 12a and 6b. The fluid pressure within the output fluid chamber i.e., the brake fluid pressure transmitted to the wheel cylinders, is maintained as long as the coil 4 is energized and the armature 7 is attracted to the right (as viewed in the drawings) by the force exerted by the energized coil 4.

In keeping with the invention, the electromagnetic attraction force of the coil 4 required for attracting the armature 7 does not have to be greater than the difference between the spring forces of the set spring 10 and the holding spring 17 before the ball 16 comes into contact with the valve seat 14a. After the ball 16 settles on the valve seat 14a, a greater force is required due to the loss of the assistance of the holding spring 17 to overcome the spring force of the set spring 10. However, a gap between the forward end of the armature 7 and the plug 6 which serves as an iron core included in the magnetic circuit for attracting the armature 7, is arranged to be small. Therefore, since the attracting force varies and is inversely proportional to the square of the gap distance, the arrangement insures a sufficient attracting force.

In this embodiment of the invention shown in FIG. 1, the value of the fluid pressure retainable within the output chamber 6b is, of course, determined by the relation of the fluid passage within the valve seat 14a, to the spring force of the holding spring 17.

As previously mentioned, it is an important feature of the invention to provide a piston cup seal 18 permitting pressure fluid to bypass the valve mechanism. When the fluid pressure is maintained within the output fluid chamber 6b with the vehicle having been brought to a stop and the coil 4 having been energized, there is the possibility that the fluid pressure thus maintained might be insufficient for continuously keeping the vehicle in a stopped condition (i.e., low brake fluid pressure). In such an event, the value of the fluid pressure maintained may be increased while keeping the automatic stop valve device in an operative state by the operator again stepping on the brake pedal. With the brake pedal thus operated again, and a greater fluid pressure developed by the master cylinder, the unidirectional sealing action of the piston cup seal 18 allows fluid to bypass around the periphery of the valve body 14 and flow from the input chamber 12a to the output fluid chamber 6b and for increased fluid pressure to be transmitted through the brake line to the wheel cylinders.

Figure 2:
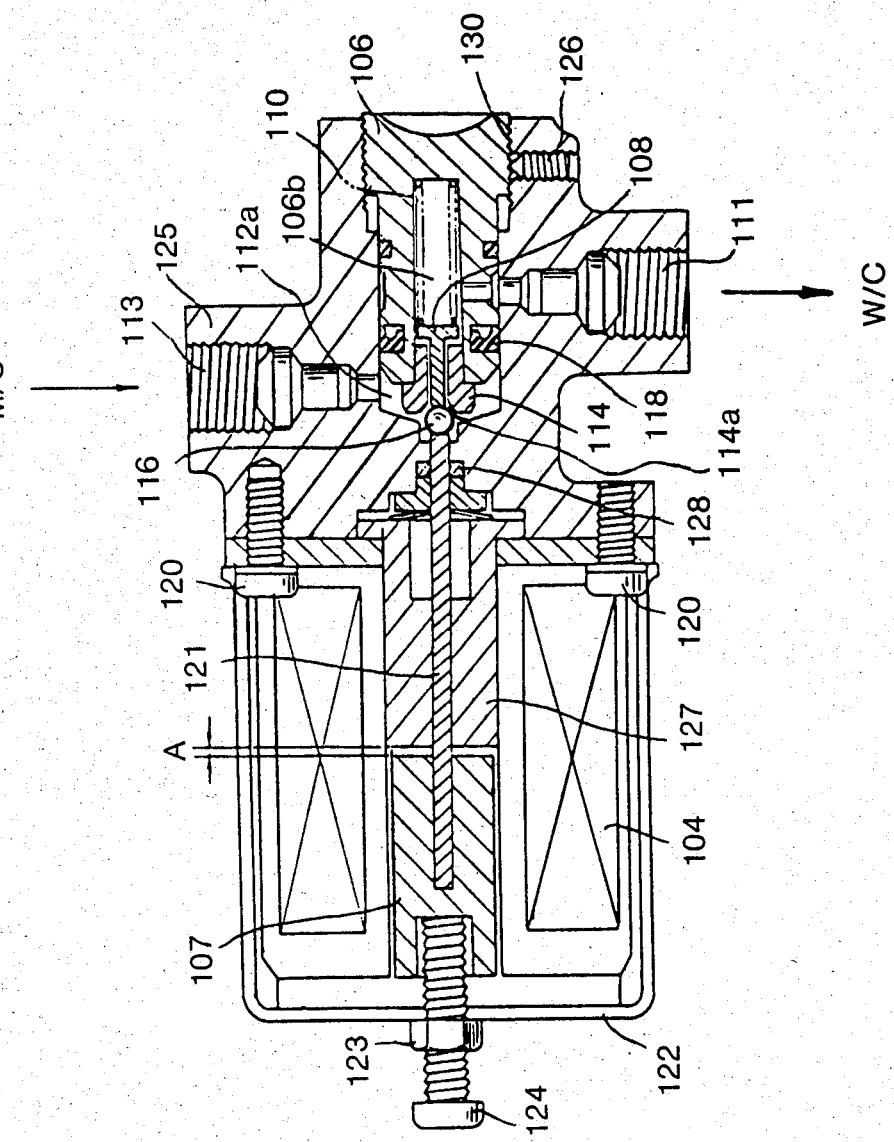
FIG. 2 is a longitudinal sectional view showing another exemplary embodiment of an automatic stop valve device embodying the present invention.
Figure 3:
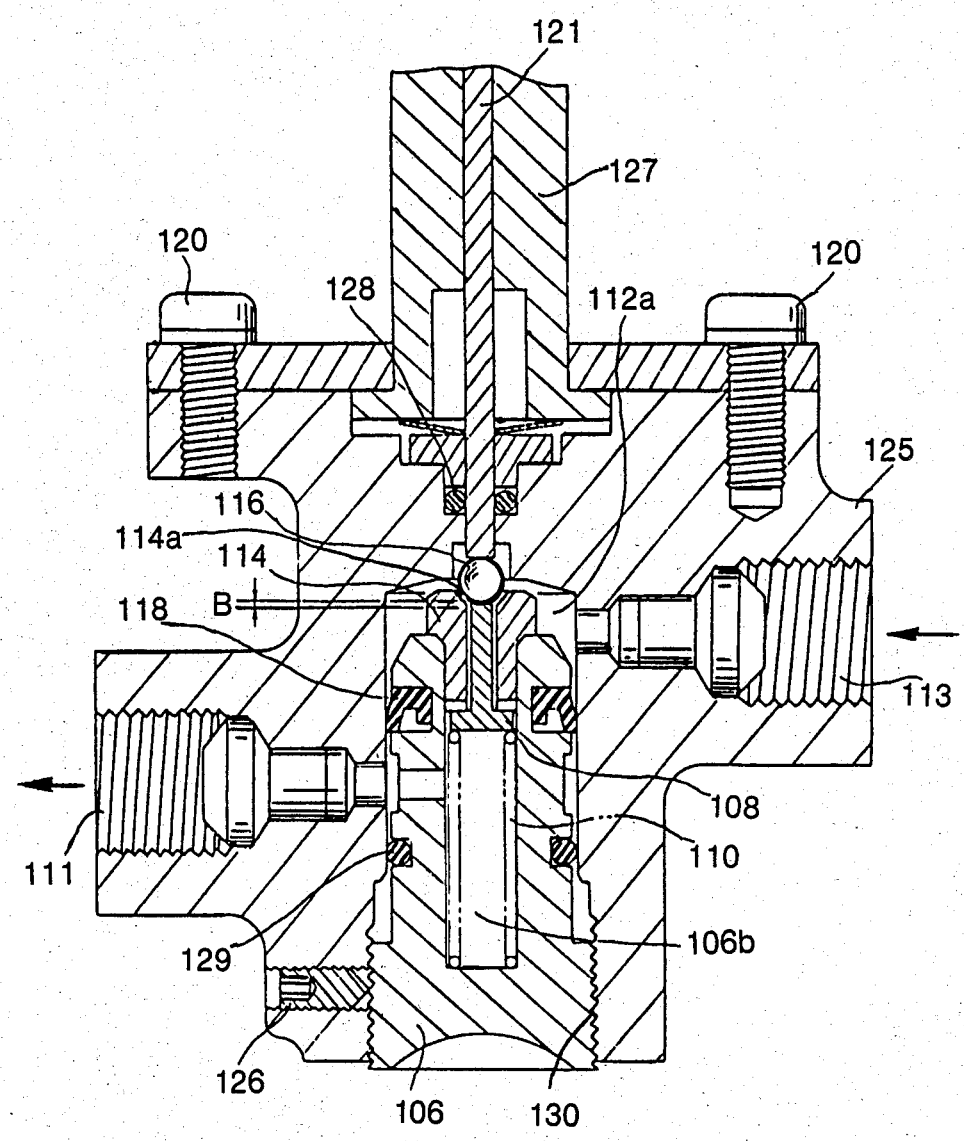
FIG. 3 is an enlarged fragmentary view of a portion of the valve mechanism shown in FIG. 2.

Further in accordance with the invention, another exemplary embodiment of the automatic stop valve device constructed according to this invention is shown in FIGS. 2 and 3. This exemplary embodiment is based on the same principal as the first embodiment as shown in FIG. 1. Thus, according to the invention, the device includes a valve mechanism herein shown as a ball 116 arranged to be moved by an electromagnetic force into contact with a stationary valve seat 114a provided by the valve body 114, the valve mechanism separating input and output chambers 112a and 106b from each other. The communication between the input and output fluid chambers 112a and 106b is blocked when the ball 116 is thus brought into contact with the valve seat 114a.

Parts which are similar to the corresponding parts of the embodiment shown in FIG. 1 are indicated in the FIGS. 2 and 3 by adding 100 to the reference numerals used in FIG. 1 and detailed description of these similar parts is omitted herein. Referring to FIGS. 2 and 3, in this exemplary embodiment the armature 107 is operable to positively move the ball 116 onto its seat 114a, the ball 116 being normally held in an open state by a locking rod member 108 disposed within a passage in the valve seat 114 and resiliently urged to the left in FIG. 2 to move the ball off its seat by a set spring 110.

As an important feature of the invention illustrated in FIGS. 2 and 3, the valve mechanism which opens and closes communication between the input chamber 112a and the output chamber 106b, is arranged as a separate component from an electromagnetic mechanism component including the armature 107 and actuating coil 104. The separate bodies of these two discrete components are joined together by fastener means such as bolts 120.

In carrying out the invention, the electromagnetic mechanism component includes the coil 104 which has a fixed iron core 127 and an axially movable armature 107. A push rod 121 which is formed in one unified body with the armature 107, is slidedly received in the fixed core 127 and projects through the core 127 to be inserted into the input fluid chamber 112a of the valve mechanism component to engage the ball 116 therein. A set spring 110 exerts a spring force on the ball 116 and resiliently urges it to an open state separated from the valve seat 114a. By this arrangement, the push rod 121 and the armature are biased to the left in FIG. 2 into their initial stationary positions where the armature abuts the end of a set screw 124. A gap "A" between the armature 107 and the iron core 127 is produced by this biasing action. In this specific exemplary embodiment, the gap "A" is adjustable by the set screw 124 to accomodate variations in tolerences between the parts as manufactured. The position of the set screw 124 may be fixed by the clearance adjustment nut 123 which is provided on the screw 124. It is preferable, in this manner, to allow adjustment of the gap "A" independently of the energization force exerted by the coil 104. The arrangement of this exemplary embodiment is greatly advantageous as it permits adjustment for inconsistancy between parts.

The valve body 114 which forms a valve mechanism in conjunction with the ball 116, is herein shown as integral with the inner end of a plug 106 which is screwed into a threaded opening 130 formed in the body 125 of the valve mechanism component. The output fluid chamber 106b is formed within the plug 106 and is separated from the input fluid chamber 112a by an axial passage through the valve body 114 which has a locking member 108 disposed in the axial passage and resiliently urged to the left in FIG. 2 toward the ball 116 by a set spring 110.

The locking rod member 108 is arranged to separate the ball 116 from the valve seat 114a under the urging of the spring 110.

Referring to FIG. 3, the preferred construction in this embodiment of the invention provides a gap "B" between the ball 116 and the valve seat 114a under the initial condition (a non-operating condition in which the ball 116 is away from the valve seat 114a), and the amount of the gap "B" is adjustable by adjusting the screwed in position of the plug 106. The relation of the gaps "A" and "B" must be A > B in order for the ball to be fully seated by the action of the armature 107. Where the gap "A" is adjusted by positioning the plug 106, the gap "B" can be also adjusted accordingly, to obtain the proper relationship of these gaps.

This embodiment of the invention shown in FIGS. 2 and 3 further includes a set screw 126 which is provided for the purpose of fixing the plug 106 after it has been screwed into a predetermined position, and seal members 128 and 129 which seal against escape of brake fluid from the brake system. This embodiment also includes a one-way, U-shaped seal 118 which allows fluid from the master cylinder to bypass the ball 116 on its seat 114, in the event that the master cylinder is operated when the coil is energized and the ball 116 is seated.

The automatic stop valve device of the embodiment shown in FIGS. 2 and 3 operates in the same manner as the embodiment of the invention shown in FIG. 1. When a moving vehicle is brought to a stop by application of the brakes, the coil 104 is energized to attract the armature 107. With the armature attracted the ball 116 is brought into contact with the valve seat 114a through the push rod 121. This closes off communication between the input and output fluid chambers 112a and 106b.

When operation of the vehicle resumes, the coil 104 is deenergized to shift the valve mechanism and release the fluid pressure within the wheel cylinders.

Control arrangements over the operations to energize the coil and to deenergize the coil when vehicle operation is resumed, may take various forms. It is preferred to energize the coil when the vehicle comes to a stop (or when its speed becomes slower than a predetermined slow speed). The coil is desirably deenergized when the accelerator pedal is operated by stepping on the pedal or when a clutch or a manual transmission is engaged.

Under the brake pressure holding or maintaining condition, when an increase in the brake pressure is desired, additional brake pressure can be supplied by passing the valve mechanism through the U-shaped seal.

Accordingly, the automatic stop valve mechanism according to this invention permits a braking force to be automatically maintained in vehicles provided with manual transmissions and vehicles with automatic transmissions while they are stopped, and thus provides great advantages for practical operation of the vehicles.

We claim:

1. An automatic stop valve device adapted to be mounted in the brake system of a vehicle comprising:
a normally open valve mechanism capable of being shifted between an open and a closed state to open and close communication between an input fluid chamber connected to receive fluid pressure from a master cylinder of said system and an output fluid chamber connected to transmit said fluid pressure to a brake device of said system for applying the brakes, said valve mechanism including a valve element comprising a movable ball cooperating with and movable relative to a valve seat in the direction toward the seat;

first spring means for maintaning said valve mechanism in the normally open position before receiving fluid pressure from said master cylinder and during an initial stage of transfer of pressure fluid from said master cylinder through said valve mechanism;

second spring means urging said ball in the direction toward said valve seat to maintain the closed state in response to increase in fluid pressure in the input fluid chamber from the master cylinder;

an electromagnetic mechanism including a coil and a movable armature actuated by the coil and connected to overcome said first spring means and cause said valve mechanism ball to shift to said closed state upon said coil being energized as the vehicle comes to a stop to maintain said fluid pressure in said output chamber and transmitted to said brake device and thereby hold the brakes in applied condition, said electromagnetic mechanism further including an element extending from said armature and engaging said ball to overcome said second spring force for maintaining said valve mechanism in the normally open position and causing said ball to be positively shifted by said second spring means onto said seat upon actuation of said coil; and unidirectional means independent of said valve mechanism for bypassing said valve mechanism and allowing pressure fluid to flow only from said input chamber to said output chamber upon increase in fluid pressure from the master cylinder and thereby increase the fluid pressure transmitted to said brake device and applying the brakes with said valve mechanism in its closed state.

2. An automatic stop valve device according to claim 1 wherein said unidirectional means comprises a U-shaped cup seal.

3. An automatic stop valve device according to claim 1 wherein said valve seat comprises a recess located in said input fluid chamber.

4. An automatic stop valve device adapted to be mounted in the brake system of a vehicle comprising:

a housing having at one end a normally open valve mechanism including a ball capable of being shifted between an open and a closed state to open and close communication between an input fluid chamber adapted to be connected to a master cylinder to receive fluid pressure from said master cylinder or said system and an output fluid chamber adapted to be connected to a brake device to transmit said fluid pressure to said break device of said system for applying the brakes, said valve mechanism ball, when in the closed state, being adapted to block the transfer of pressure fluid from the input chamber to the output chamber upon increase in fluid pressure from the master cylinder, said valve mechanism ball being movable relative to a valve seat in the direction toward the seat to maintain the closed state in response to increase in fluid pressure in the input chamber from the master cylinder;

spring means for maintaining said valve mechanism in the normally open position before receiving fluid pressure from said master cylinder and during an initial stage of transfer of pressure fluid from said master cylinder through said valve mechanism;

unidirectional means independent of said valve mechanism for bypassing said valve mechanism and allowing pressure fluid to flow only from said input chamber to said output chamber upon increase in fluid pressure from the master cylinder and thereby increase the fluid pressure transmitted to said brake device and applying the brakes with said valve mechanism in its closed state;

an electromagnetic mechansim at a second end of said housing including a coil and a movable armature actuated by the coil and connected to shift said valve mechanism ball to said closed state on said seat upon said coil being energized as the vehicle comes to a stop to maintain said fluid pressure in said output chamber and transmitted to said brake device and thereby hold the brakes in applied condition; and adjusting means projecting from said housing and connected to fix the normally open position of said ball.

5. An automatic valve device according to claim 4, wherein said valve mechanism and said electromagnetic mechanism comprise components having separate bodies joined together by fastener means.

6. An automatic stop valve device for a vehicle according to claim 4 wherein said unidirectional fluid passing means is a piston cup.

7. An automatic stop valve device according to claim 4, said adjusting means including a member projecting from said second end of said housing and connected to fix the normally open position of said armature and thereby said ball.

8. An automatic stop valve device according to claim 4, said adjusting means including an adjusting member projecting from said first end of said housing and connected to fix the normally open position of said valve seat relative to said ball and thereby the normally open position of said ball.

9. An automatic stop valve device according to claim 4 wherein said electromagnetic mechanism includes an element extending from said armature and engaging said ball to cause said ball to shift onto said seat upon actuation of said coil.

10. An automatic stop valve device adapted to be mounted in the brake system of a vehicle comprising:

a normally open valve mechanism capable of being shifted between an open and a closed state to open and close communication between an input fluid chamber connected to receive fluid pressure from a master cylinder of said system and an output fluid chamber connected to transmit said fluid pressure to a brake device of said system for applying the brakes, said valve mechanism including a valve element comprising a movable ball cooperating with and movable relative to a valve seat in the direction toward the seat to maintain the closed state in response to an increase in fluid pressure in the input fluid chamber from the master cylinder;

first spring means for maintaining said valve mechanism in the normally open position before receiving fluid pressure from said master cylinder and during an initial stage of transfer of pressure fluid from said master cylinder through said valve mechansim;

an electromagnetic mechanism including a coil, a movable armature, and an element extending from said armature and engaging said ball, said movable armature actuated by the coil and connected to overcome said first spring means and shift said ball onto said valve seat and to said closed state upon said coil being enlarged as the vehicle comes to a stop to maintain said fluid pressure in said output chamber and transmitted to said brake device and thereby hold the brakes in applied condition; and unidirectional means independent of said valve mechanism comprising a U-shaped cup seal for bypassing said valve mechanism and allowing pressure fluid to flow only from said input chamber to said output chamber upon increase in fluid pressure from the master cylinder and thereby increase the fluid pressure transmitted to said brake device and applying the brakes with said valve mechanism in its closed state.

11. An automatic stop valve device adapted to be mounted in the brake system of a vehicle comprising:

a normally open valve mechanism capable of being shifted between an open and a closed state to open and close communication between an input fluid chamber connected to receive fluid pressure from a master cylinder of said system and an output fluid chamber connected to transmit said fluid pressure to a brake device of said system for applying the brakes, said valve mechanism including a valve element comprising a movable ball cooperating with and movable relative to a valve seat in the direction toward the seat;

first spring means for maintaining said valve mechanism in the normally open position before receiving fluid pressure from said master cylinder and during an initial stage of transfer of pressure fluid from said master cylinder through said valve mechanism;

second spring means urging said ball in the direction toward said valve seat to maintain the closed state in response to increase in fluid pressure in the input fluid chamber from the master cylinder;

an electromagnetic mechanism including a coil and a movable armature actuated by the coil and connected to overcome said first spring means and cause said valve mechanism ball to shift to said closed state upon said coil being energized as the vehicle comes to a stop to maintain said fluid pressure in said output chamber and transmitted to said brake device and thereby hold the brakes in applied condition; and unidirectional means independent of said valve mechanism comprising a U-shaped cup seal for bypassing said valve mechanism and allowing pressure fluid to flow only from said input chamber to said output chamber upon increase in fluid pressure from the master cylinder and thereby increase the fluid pressure transmitted to said grake device and applying the brakes with said valve mechanism in its closed state.

* * * * *